May 19, 1970     J. L. CANNELLA     3,512,843
TRAILER BRAKE RELEASE
Filed Nov. 5, 1968
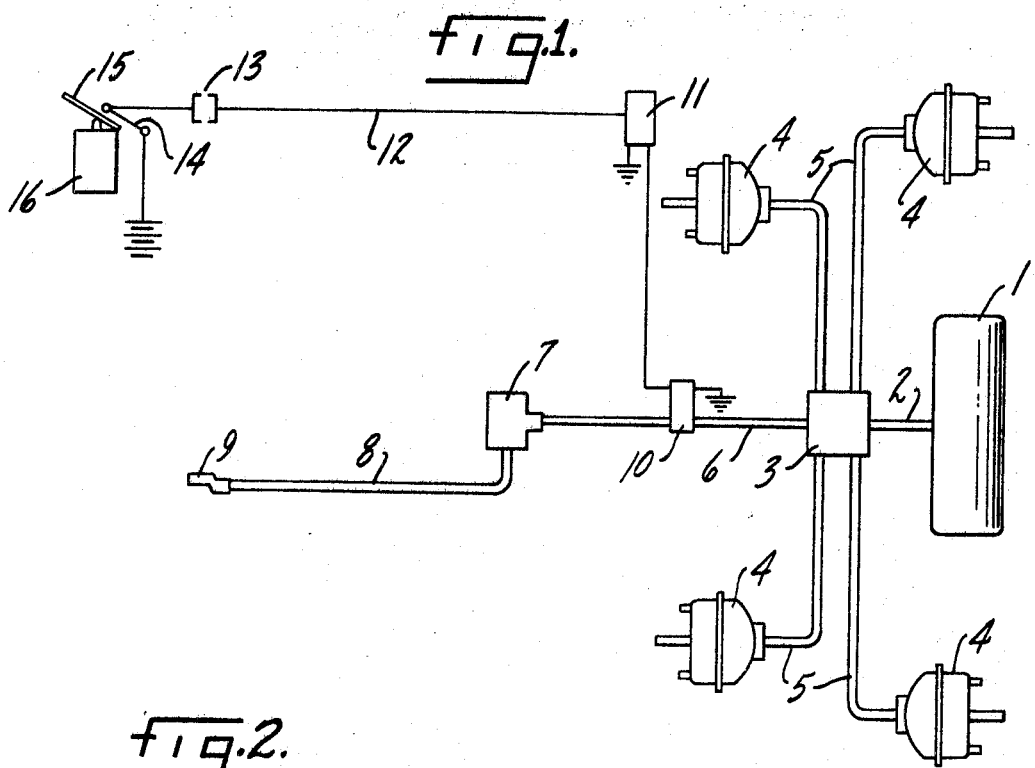
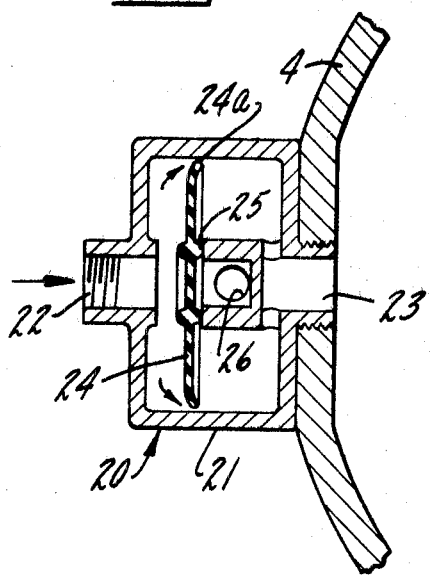
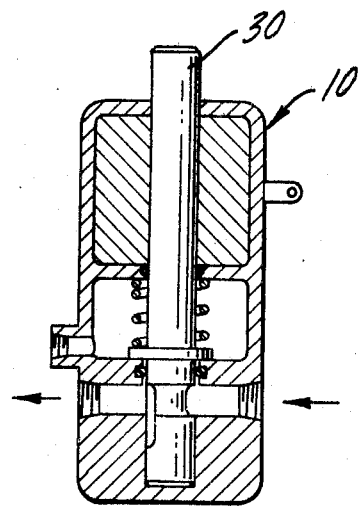
INVENTOR.
Joseph L. Cannella
BY Parker, Carter & Markey
Attorneys.

United States Patent Office 3,512,843
Patented May 19, 1970

3,512,843
TRAILER BRAKE RELEASE
Joseph L. Cannella, Melrose Park, Ill., assignor to Berg Mfg. & Sales Co., Des Plaines, Ill., a corporation of Illinois
Filed Nov. 5, 1968, Ser. No. 773,401
Int. Cl. B60t *13/68*
U.S. Cl. 303—7                     3 Claims

ABSTRACT OF THE DISCLOSURE

A release for trailer brake systems in which a switch is closed upon release of the tractor brake pedal to supply electrical energy to an electrically openable exhaust valve to exhaust the relay emergency valve and each of the brake actuators is provided with a quick-acting exhaust valve responsive to diminution of pressure delivered to the actuators.

SUMMARY OF THE INVENTION

In a trailer brake system having a plurality of brake actuators supplied with fluid pressure through an emergency relay valve, a release system wherein each of the actuators has a quick-acting exhaust valve responsive to diminution in pressure from the relay emergency valve and the relay emergency valve has its service side exhaustible through an electrically openable valve responsive to release of the tractor foot pedal.

This invention relates to combination tractor-trailer vehicles and has particular relation to the trailer brake system thereof.

Delay in releasing the brakes of the trailer following release of the tractor brakes results in trailer drag, shock and strain to the tractor-trailer connections, skidding on slippery surfaces and the like. Hence it is one purpose of the present invention to accelerate the release of the trailer brakes in response to release of the tractor brakes.

Another purpose of the invention is to provide release of trailer brakes far more rapidly than the case would be if the trailer brakes awaited decay and diminution of the service brake system extending back to the tractor.

Another purpose is to provide a rapid trailer brake release system of maximum economy in manufacture and use.

Other purposes may appear from time to time during the course of the specification and claims.

BRIEF DESCRIPTION OF THE DISCLOSURE

The invention is illustrated more or less diagrammatically in the accompanying drawings wherein:

FIG. 1 is a schematic illustration of the system;

FIG. 2 is a detail illustrating a quick-acting release valve of the system; and

FIG. 3 is a cross-sectional view of a three-way valve usable with the system.

Like parts are indicated by like numerals throughout the specification and drawings.

DESCRIPTION OF THE PREFERRED EMBODIMENT

Referring now to the drawings, it will be noted that the trailer brake system employs the conventional elements including the trailer-mounted, fluid pressure reservoir or tank 1. The tank 1 communicates as by conduit 2 with a relay emergency valve 3. Since the operation of the relay emergency valve is well known to those skilled in the art, it is not shown in detail herein. It will be understood that the relay emergency valve opens to provide communication of the tank 1 with a plurality of trailer brake actuating chambers 4, each of the chambers 4 communicating with valve 3 through a suitable conduit 5. The area above the service piston (not shown) within the relay emergency valve 3 is supplied with fluid pressure through a suitable service conduit 6. The conduit 6 is connected to the outlet of a two-way check valve 7, one inlet of which is supplied with fluid pressure by service line 8 and service gladhand connector 9 in known manner.

An electrically operated valve 10 is connected in conduit 6 and supplied with electrical energy through time delay switch or device 11 by conductor 12, tractor-trailer connection 13 and the switch 14 which closes to supply electrical energy in response to release of the tractor-mounted brake actuating foot pedal 15, the pedal 15 being positioned for actuation of a brake application valve 16.

As may be best seen in FIG. 2, each of the actuating chambers 4 and its conduit 5 has associated therewith a suitable quick release or exhaust valve means 20.

The exhaust valve means 20 includes a housing 21 having a fluid pressure inlet 22 communicating with its associated conduit 5. The housing 21 has an outlet 23 for delivery of fluid pressure from the conduit 5 to the area within the actuating chamber 4 (shown in part in FIG. 2) for actuation of the trailer brake connected thereto. A pressure-responsive valve member 24 is movable within the housing 21 between a first and second position. With an excess of pressure at inlet 22 over that at outlet 23 and thus over the pressure within the actuator 4, the valve member 24 is urged by said excess of pressure against a valve seat 25 to close an exhaust outlet passage 26. In such position, as the parts are shown in FIG. 2, the valve member 24 permits passage of fluid pressure from inlet 22 to outlet 23. As shown, said pressure passes about the flexible peripheral skirt portion 24a of valve member 24.

Upon diminution of pressure at inlet 22 below that at outlet 23 and thus below that within the actuating chamber 24, said pressure variance produces a retrograde movement of valve member 24 off its seat 25. Said variance further produces a sealing of the skirt 24a against the inner walls of the chamber formed by the housing 21. With the valve member 24 off its seat, the outlet 23, and thus the area within the actuating chamber 4, is communicated with exhaust outlet passage 26 and the brake chamber 4 is exhausted to atmosphere. At the same time the member 24 is effective to seal inlet 22 against communication with exhaust outlet 26.

Referring now to FIG. 3, it will be observed that, while the valve 10 could take a variety of forms, the form shown provides for a fail-safe operation in that the valve member 30 in valve 10 has the position shown in FIG. 3 as its normal position, i.e. the position which said valve member will occupy whenever electrical energy is absent from or fails of delivery to valve 10. In such position conduit 6 remains open for a normal transmission of fluid pressure in either direction therethrough and the standard brake system remains effective. Upon supply of electrical energy to the solenoid coil, however, the valve stem is drawn into its second position, wherein the portion of conduit 6 between valves 10 and 3 and the area above the service piston in valve 3 will be exhausted to atmosphere.

The use and operation of the invention are as follows:

When the vehicle operator presses the foot pedal 15 downwardly to apply the brakes, the switch 14 is opened and the elements 10–14 of the system of the invention will be inoperative. Fluid pressure is delivered from the tractor through elements 9–6 to valve 3 to open it. Fluid pressure then flowing from tank 1 through valve 3 to chambers 4 flows through inlet 22 of each quick-acting, pressure-transmitting and exhaust valve 20 to close the exhaust outlet 26 and to supply fluid pressure around valve 24 to the associated chamber 4 to apply the brakes.

Upon release of the brake pedal 15 and its return to the released position shown schematically in FIG. 1 herein, the switch 14, which will be understood as operatively connected to pedal 15, closes to supply electrical energy through the connector 13, conductor 12, time delay device 11 and conductor 10a to the electrically operated valve 10. Thereupon the valve 10 is moved into its second or exhaust position to exhaust the area above the service piston within relay valve 3.

The resulting movement of the service piston within valve 3 exhausts the same and diminishes the pressure in conduits 5, whereupon the excess of pressure thus created within the actuators 4 and outlet 23 of member 20 is effective to unseat valve 24 and to communicate the exhaust passage or outlet 26 of member 20 with the area within brake actuating chambers 4 and thus to exhaust the brake-actuating chambers 4 and thus to exhaust the brake-actuating chambers to atmosphere. Thus the brake actuating chambers 4 are exhausted and the trailer brakes are released substantially simultaneously with the release of brake pedal 15 and the tractor brakes (not shown) controlled thereby.

Valve 10, employing the almost instant speed of electrical energy, thus permits movement of relay valve 3 to its exhaust position at a substantially earlier point than would be the case were the valve 3 to await the diminution or decay of fluid pressure in the service system of the tractor and in service elements 9, 8, 7 and 6. Similarly, the provision of a quick release or quick exhaust valve 20 at or adjacent each of the actuators 4 further accelerates the exhaust of the chambers 4 and thus the release of the trailer brakes, since the pressure within chambers 4 need not travel through the conduits 5 and the elements (not shown) within relay valve 3.

The embodiments of the invention in which an exclusive property or privilege is claimed are defined as follows:

1. A release structure for trailer brake systems having a fluid pressure reservoir, a relay valve and a plurality of actuating chambers communicating with said reservoir through said relay valve, the improvement comprising the combination of: an electrically operated exhaust valve communicating with said relay valve, means responsive to release of the tractor brake system to supply electrical energy to said electrically operated valve to move the same into exhaust position, and a plurality of exhaust valves, each exhaust valve communicating with and mounted adjacent to a respective one of said brake actuating chambers, each exhaust valve operating responsive to diminution of pressure between said relay valve and said brake actuating chambers to exhaust said chambers.

2. The structure of claim 1 wherein each said chamber exhaust valves includes a housing having an inlet communicating with said relay valve and an outlet communicating with said chamber, a valve element in said housing, an exhaust outlet in said housing, said valve element being movable into position closing said exhaust outlet in response to excess of pressure at said inlet over the pressure at said outlet, said exhaust valve member being movable into a position communicating said exhaust outlet with said housing outlet in response to excess of pressure at said outlet over that at said inlet.

3. A release structure for trailer brake systems having a fluid pressure reservoir, a relay valve, and a plurality of actuating chambers communicating with said reservoir to said relay valve, an electrically operated exhaust valve communicating with said relay valve, means responsive to release of the tractor brake system to supply electrical energy to said electrically operated valve to move the same into exhaust position, an exhaust valve communicating with each of said brake actuating chambers and responsive to diminution of pressure between said relay valve and said brake actuating chambers to exhaust said chambers, and a time delay device in said means to supply electrical energy to said electrically operated valve whereby said electrically operated valve is moved into its exhaust position for a predetermined time duration, said electrically operated valve having a normal position occupied thereby in the absence of electrical energy supplied to said valve, said normal position maintaining an open passage through said valve.

References Cited

UNITED STATES PATENTS

| | | | |
|---|---|---|---|
| 2,169,668 | 8/1939 | Thomas | 188—3 |
| 2,718,897 | 9/1955 | Andrews. | |
| 2,800,980 | 7/1957 | Flockhart | 303—68 X |

MILTON BUCHLER, Primary Examiner

J. J. McLAUGHLIN, Jr., Assistant Examiner

U.S. Cl. X.R.

188—3; 303—3, 15, 69